US008700726B2

(12) United States Patent
Saeed

(10) Patent No.: US 8,700,726 B2
(45) Date of Patent: Apr. 15, 2014

(54) STORAGE REPLICATION SYSTEMS AND METHODS

(75) Inventor: Tariq Saeed, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 687 days.

(21) Appl. No.: 12/638,868

(22) Filed: Dec. 15, 2009

(65) Prior Publication Data

US 2011/0145357 A1 Jun. 16, 2011

(51) Int. Cl.
*G06F 15/167* (2006.01)

(52) U.S. Cl.
USPC ........................................... 709/213

(58) Field of Classification Search
None
See application file for complete search history.

(56) References Cited

U.S. PATENT DOCUMENTS

| | | | | |
|---|---|---|---|---|
| 6,618,709 | B1 * | 9/2003 | Sneeringer | 705/412 |
| 6,681,251 | B1 * | 1/2004 | Leymann et al. | 709/226 |
| 6,748,414 | B1 * | 6/2004 | Bournas | 718/105 |
| 6,850,984 | B1 * | 2/2005 | Kalkunte et al. | 709/229 |
| 8,489,735 | B2 * | 7/2013 | Befort | 709/224 |
| 2003/0097461 | A1 * | 5/2003 | Barham et al. | 709/235 |
| 2004/0019661 | A1 * | 1/2004 | Eleftheriou et al. | 709/219 |
| 2005/0182823 | A1 * | 8/2005 | Schmidt | 709/216 |
| 2008/0228459 | A1 * | 9/2008 | Jiang et al. | 703/13 |

OTHER PUBLICATIONS

Symantec Corporation, "Veritas™ Volume Replicator Administrator's Guide", Solaris, 5.0 Maintenance Pack 3, 2008.
Symantec Corporation, "Veritas™ Volume Manager Administrators Guide", Solaris, 5.0 Maintenance Pack 3, 2008.

* cited by examiner

*Primary Examiner* — Brian P Whipple
(74) *Attorney, Agent, or Firm* — Wilmer Cutler Pickering Hale and Dorr LLP

(57) ABSTRACT

Systems and methods for information storage replication are presented. In one embodiment a storage flow control method includes estimating in a primary data server what an outstanding request backlog trend is for a remote secondary data server; determining a relationship of an outstanding request backlog trend to a threshold; and notifying a client that the primary data server can not service additional requests if the trend exceeds the threshold. In one embodiment the estimating comprises: sampling a number of outstanding messages at a plurality of fixed time intervals; and determining if there is a trend in the number of outstanding messages over the plurality of fixed time intervals. It is appreciated the estimating can be performed in a variety of ways, (e.g., utilizing an average, a moving average, etc). Determining the trend can include determining if values monotonically increase. The estimating in the primary server can be performed without intruding on operations of the remote secondary data server. The primary data server and the secondary data server can have a variety of configurations (e.g., a mirrored configuration, a RAID5configuration, etc.).

20 Claims, 8 Drawing Sheets

STORAGE REPLICATION SYSTEMS AND METHODS

FIELD OF THE INVENTION

The present embodiments relate to the field of information storage replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended developing the information. Maintaining accurate replicated storage of the information is often very important for a variety or reasons (e.g., disaster recovery, corruption correction, etc.).

Redundant storage of large amounts of information often consumes significant resources and can slow performance. In architectures with multiple data servers storage information is often conveyed between the data servers. For example, in RAID1 (e.g., mirror configuration) and RAID5 architectures storage information is typically communicated and stored between a plurality of storage resources in the architecture. Operating capacity of the data servers and communication bandwidth between them are often at a premium. The data servers typically have a limited number of storage requests the data servers can process and handle. If additional storage requests are forwarded before the previous requests are adequately handled, a data server typically rejects the additional storage requests. However, in response to a rejection a storage request initiator often reinitiates the storage request before the target data server has had a chance to complete the prior backlog of storage requests. Repeated storage requests between data servers can cause significant consumption of network communication bandwidth and usually exacerbate a target data server's ability to clear out the backlog as operational resources are committed to just handling the repeated requests. In some conventional attempts a sender requests a credit of how many messages can be outstanding in the remote procedure call (RPC) header, however they do not sense the load on a remote target.

SUMMARY

Systems and methods for information storage replication are presented. In one embodiment, a storage flow control method includes estimating in a primary data server what an outstanding request backlog trend is for a remote secondary data server; determining a relationship of the outstanding request backlog trend to a threshold; notifying a client that the primary data server can not service additional requests if the outstanding request backlog trend exceeds the threshold; and forwarding a storage request and corresponding information to said secondary server if said outstanding request backlog trend does not exceed said outstanding request backlog threshold. In one embodiment the estimating comprises: sampling a number of outstanding messages at a plurality of fixed time intervals; and determining if there is a trend in the number of outstanding messages over the plurality of fixed time intervals. It is appreciated the estimating can be performed in a variety of ways, (e.g., utilizing an average, a moving average, etc). Determining the trend can include determining if values monotonically increase. The estimating in the primary server can be performed without intruding on operations of the remote secondary data server. The primary data server and the secondary data server can have a variety of configurations (e.g., a mirrored configuration, a RAID5configuration, etc.).

In one embodiment a computer readable storage medium having stored thereon, computer-executable instructions that when executed by a computing device cause the computing device to perform a method comprising: estimating in a primary data server what an outstanding request backlog trend is for a remote secondary data server; determining a relationship of the outstanding request backlog trend to a threshold; notifying a client that the primary data server can not service additional requests if the outstanding request backlog trend exceeds the threshold; and forwarding a storage request and corresponding information to said secondary server if said outstanding request backlog trend does not exceed said outstanding request backlog threshold. In one exemplary implementation a system, comprises a computer system having a processor coupled to a computer readable storage media and executing computer readable code which causes the computer system to perform a method of: estimating in a primary data server what an outstanding request backlog trend is for a remote secondary data server; determining a relationship of the outstanding request backlog trend to a threshold; notifying a client that the primary data server can not service additional requests if the outstanding request backlog trend exceeds the threshold; and forwarding a storage request and corresponding information to said secondary server if said outstanding request backlog trend does not exceed said outstanding request backlog threshold.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

DETAILED DESCRIPTION

Figure 1A:
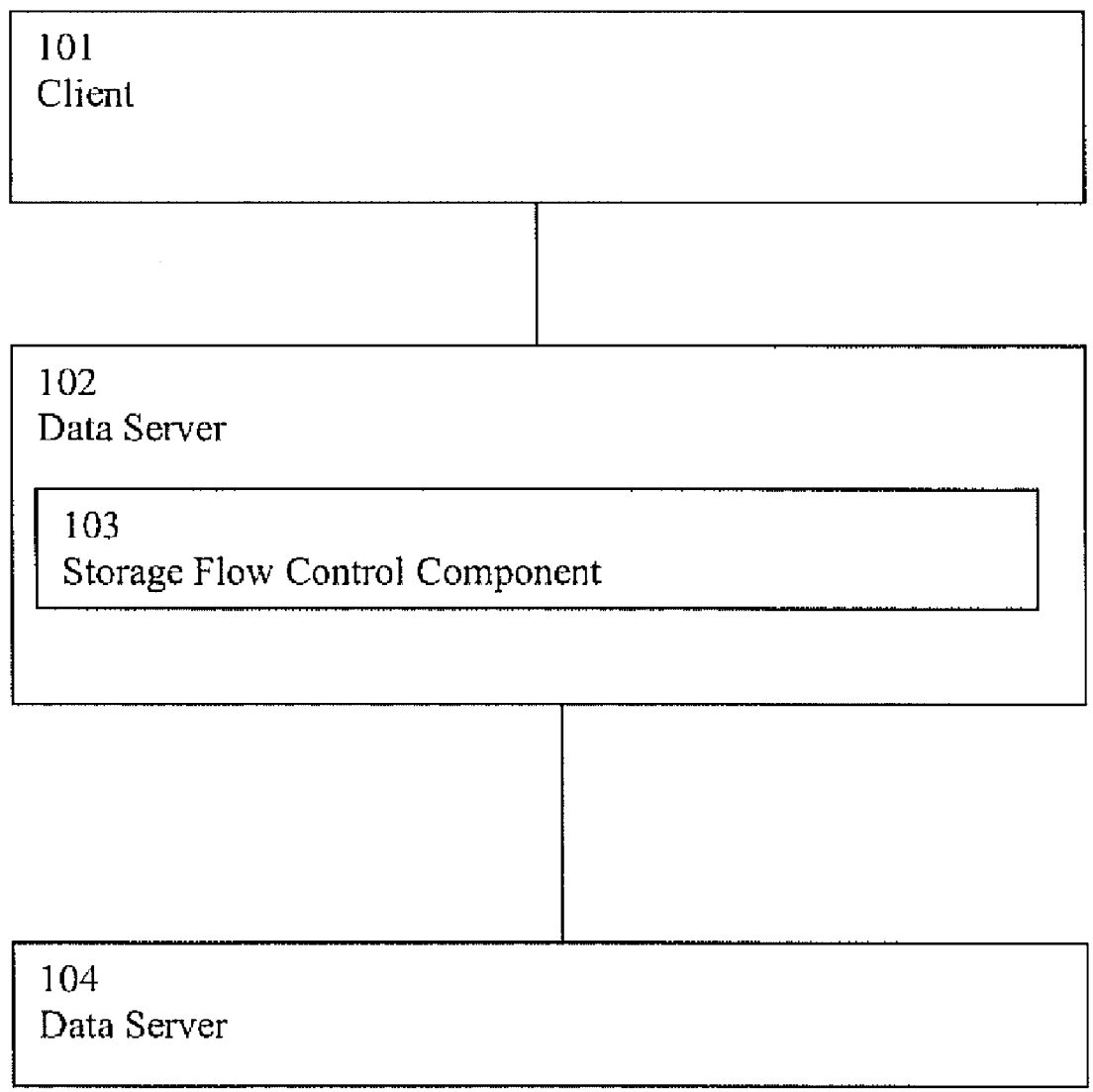
FIG. 1A is a block diagram of an exemplary system in accordance with one embodiment.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective storage request flow. Storage systems and methods facilitate utilization of file system resources to reduce time and occupation of resources during information replication operations. The intelligent storage request flow control performs replication of relevant information (e.g., information that is in use, information that is written to designated volumes, etc.) while minimizing communication and processing of repeated "premature" storage request attempts. In one embodiment, the storage request flow control senses backlog buildup on a remote object store device in an object file system. In one embodiment, the object store device is a data server. The storage request flow control can be implemented in a variety of configurations and architectures without interfering with the operations of downstream data servers.

In one embodiment, a redundant storage system can have three major types of components that communicate with each other: clients, object store device (OSD), and a metadata server (MDS). Each component can run on a separate device or system and there can be multiple instances of each component. In a raid configuration example, a set of OSDes can be configured in a RAID1 or mirror array or a RAID5 array for client file. It is the responsibility of the OSDes comprising the RAID cluster to copy client's data to each other for redundancy. In one exemplary implementation, if a client's file is mirrored, the client issues a WRITE RPC to only one OSD, which in turn forwards data to its mirrors through a separate WRITE RPC before completing the client's write. The service time on the mirror OSD can vary depending on the workload. Moreover, the mirror OSD is also servicing client writes at the same time it services the mirror copy message from other OSDs. If the mirror OSD has a heavier work load, a queue of client writes can build up that would otherwise lead to remote procedure call (RPC) timeouts at the client end. The client would otherwise resend the timed-out messages, leading to an eventual resource exhaustion chain reaction in the OSDs as well as increasing network congestion between the OSDs. The present approach flow control mechanism facilitates reduction in the excessive repetitive and wasteful OSD to OSD storage requests. The OSDs can be included in an object file system implemented on a public network communicating through RPC ONC TCP.

An alternate approach could include putting an upper bound on OSD-OSD data forwarding messages that can be outstanding at any given time and use it to throttle the client RPC. In this solution the work load, and therefore the service time in the OSD receiving data forwards varies as a function of time. There may be rapid throttling of the client and if the remote OSD is very lightly loaded at an instant in time the OSD could otherwise handle many more messages than the fixed upper bound. Excessively rapid throttling can be mitigated by utilizing an approximation of the average service time of the remote OSD in a given time window (since the average can vary). In one embodiment, the average is quickly approximated by examining storage request backlogs to predict or estimate a build up on the remote OSD.

FIG. 1A is an exemplary block diagram of a replication storage system 100 in accordance with one embodiment of the present invention. Replication system 100 includes a client 101, data server 102 which includes a storage flow component 103 and data server 104. Client 101 is communicatively coupled to data server 102 which is communicatively couple to data server 104. The components of replication system 100 cooperatively operate to perform intelligent and efficient storage of information. Client 101 is performs a variety of client application operations, including writing and reading information to and from data sever 102. Data server 102 stores information for client 101 and forwards information to data sever 104 for duplicative or replication storage. Storage flow component 103 controls receipt of information from client 101 and forwarding of information to data sever 104. In one embodiment, storage flow component 103 estimates a storage request backlog in data server 104 and when the estimate of storage requests backlog exceeds a threshold the storage flow component 103 denies new storage requests from client 101 until the estimated backlog request falls back sufficiently below the threshold. In one embodiment, the threshold is set to mitigate inefficient delays and resource consumption that would otherwise be associated with data storage request from data server 102 to data server 104.

Figure 1B:
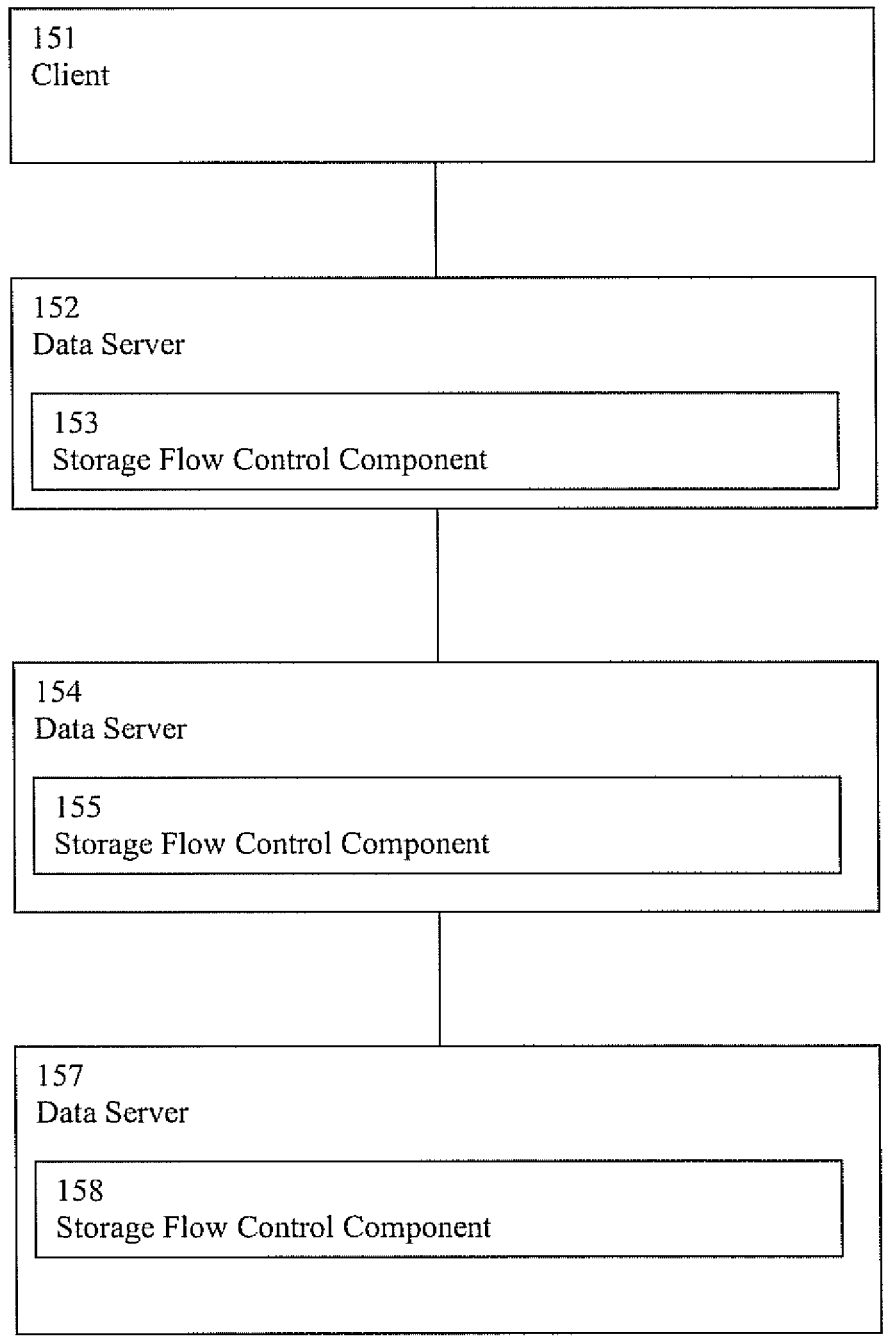
FIG. 1B is a block diagram of another exemplary system in accordance with one embodiment.

It is appreciated that the present invention can be implemented in a variety of configurations and embodiments. FIG. 1B is an exemplary block diagram of replication storage system 159 in accordance with one embodiment of the present invention. Replication storage system 159 includes client 151, data sever 152, data sever 154 and data sever 157. Data severs 152, 154 and 157 include storage flow control components 153, 155 and 158 respectively. Data severs 152, 154 and 157 operate similar to data sever 102 and storage flow control components 153, 154 and 158 operate similar to storage flow control component 103. In replication storage system 159, data server 152 forwards storage information to data sever 154 and storage flow control component 153 estimates the storage request backlog of requests in data server 154. Data server 154 forwards storage information to data sever 157 and storage flow control component 155 estimates the storage request backlog of requests in data server 157. Again, it is appreciated there can be a variety of configurations. For example, client 151 can be communicatively coupled (not shown) directly to data sever 154 and data sever 157 as well. For example, client 151 can forward information to data sever 157 and data server 157 forwards storage information to data sever 154 and storage flow control component 158 estimates the storage request backlog of requests in data server 154. If the storage flow control component 158 estimates the backlog threshold is exceed the data sever 157 rejects storage requests from client 151 until the estimated backlog request falls back sufficiently below the threshold.

In one embodiment, a client is unaware of the redundancy. The client obtains a map comprising the OSDs and a stripe width, from the MDS. The map indicates nothing about RAID0/RAID1/RAID5. Regardless of the redundancy, the client simply writes to the OSDs in a round-robin manner, limiting a single write to an OSD to a stripe-width size, then moving on to the next OSD in the map to write the next stripe width size write, and so on. The redundancy info is stored within the OSD. So for example, if it is RAID1, the OSD will copy the entire write to every other OSD in the redundancy array. For RAID5, the OSD will compute and store parity but forward pieces of data to appropriate OSDs (e.g., the raid columns).

Figure 2:
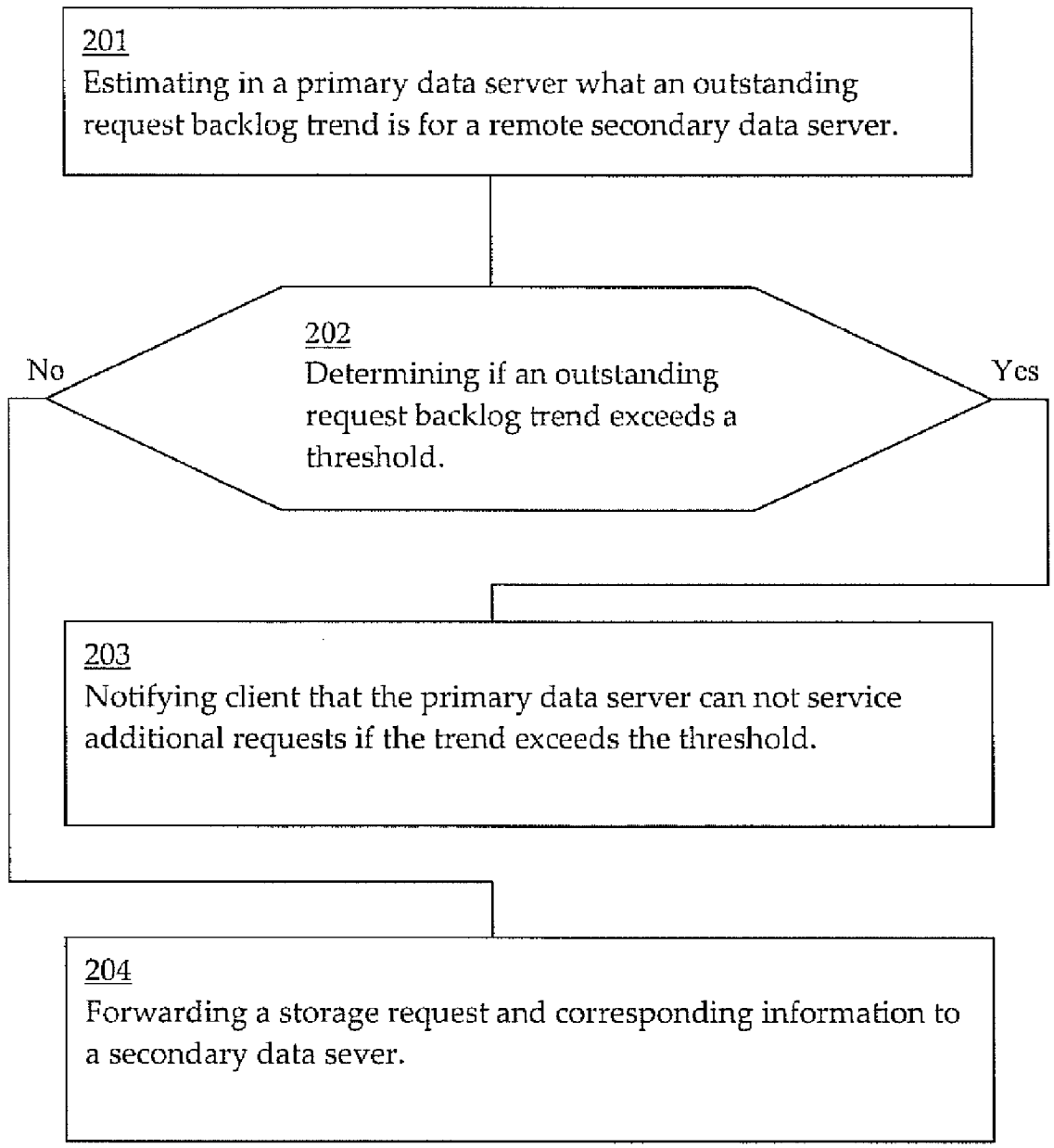
FIG. 2 is a flow chart of an exemplary method in accordance with one embodiment.

FIG. 2 is a flow chart of storage flow control method 200 in accordance with one embodiment of the present invention. In one embodiment, storage flow control method facilitates data storage request flows between data severs based upon a prediction of the availability of a one data sever to handle storage requests from another first data sever. It is appreciated the data severs can be configured in a variety of storage architectures or hierarchies. For example, the data severs can be configured in a mirror architecture, a RAID1 architecture, a RAID5 architecture, etc. The same data server can be servicing client files in different raid configurations (e.g., RAID1, RAID5, etc.) at the same time. In one embodiment, storage flow control method 200 is implemented on a processor and a computer readable medium. In one exemplary implementation, a computer readable medium includes instructions for directing a processor in the performance of storage flow control method 200.

In block 201, an outstanding request backlog trend for a remote secondary data server is estimated in a primary data server. In one embodiment, the estimating includes sampling a number of outstanding messages at a plurality of fixed time intervals; and determining if there is a trend in the number of outstanding messages over said plurality of fixed time intervals. In one exemplary implementation, the estimating operations in the primary sever are performed without intruding on operations of the remote secondary data server. For example, the primary data sever tracks (e.g., maintains a log, table, data structure, register, etc.) how many requests are sent to the secondary data sever that have not received a completion response without needing additional input or information from the secondary data sever. Additional queries are not needed to the secondary data server to determine how many outstanding storage requests from the primary data server are in the secondary data server queue. It is appreciated the estimating is compatible with a variety of mechanisms or approaches. In one exemplary implementation, the estimating is based upon a moving average of outstanding storage requests to the secondary data server.

In block 202, a determination is made regarding a relationship of an outstanding request backlog trend to a threshold. In one embodiment, the determining includes determining if values corresponding to the number of outstanding request monotonically increases. In one exemplary implementation, the outstanding request backlog trend is compared to a threshold. If the trend does not exceed the threshold the process proceeds to block 204. If the trend exceeds the threshold the process proceeds to block 203.

In block 203, a client is notified that the primary data server can not service additional requests. In one embodiment, the client waits a predetermined time before attempting to forward the storage request again to the primary data server. In another embodiment, the client waits for an indication from the primary data sever that the data server is ready for additional storage requests.

In block 204, the storage request and corresponding information is forwarded to a secondary data sever. In one embodiment, the secondary data server stores the information and returns an acknowledgement to the primary data server. The primary data server can remove the serviced request from the backlog estimate when the service acknowledgement is received from the secondary data server indicating the information has been successfully stored in the secondary data server.

Figure 3:
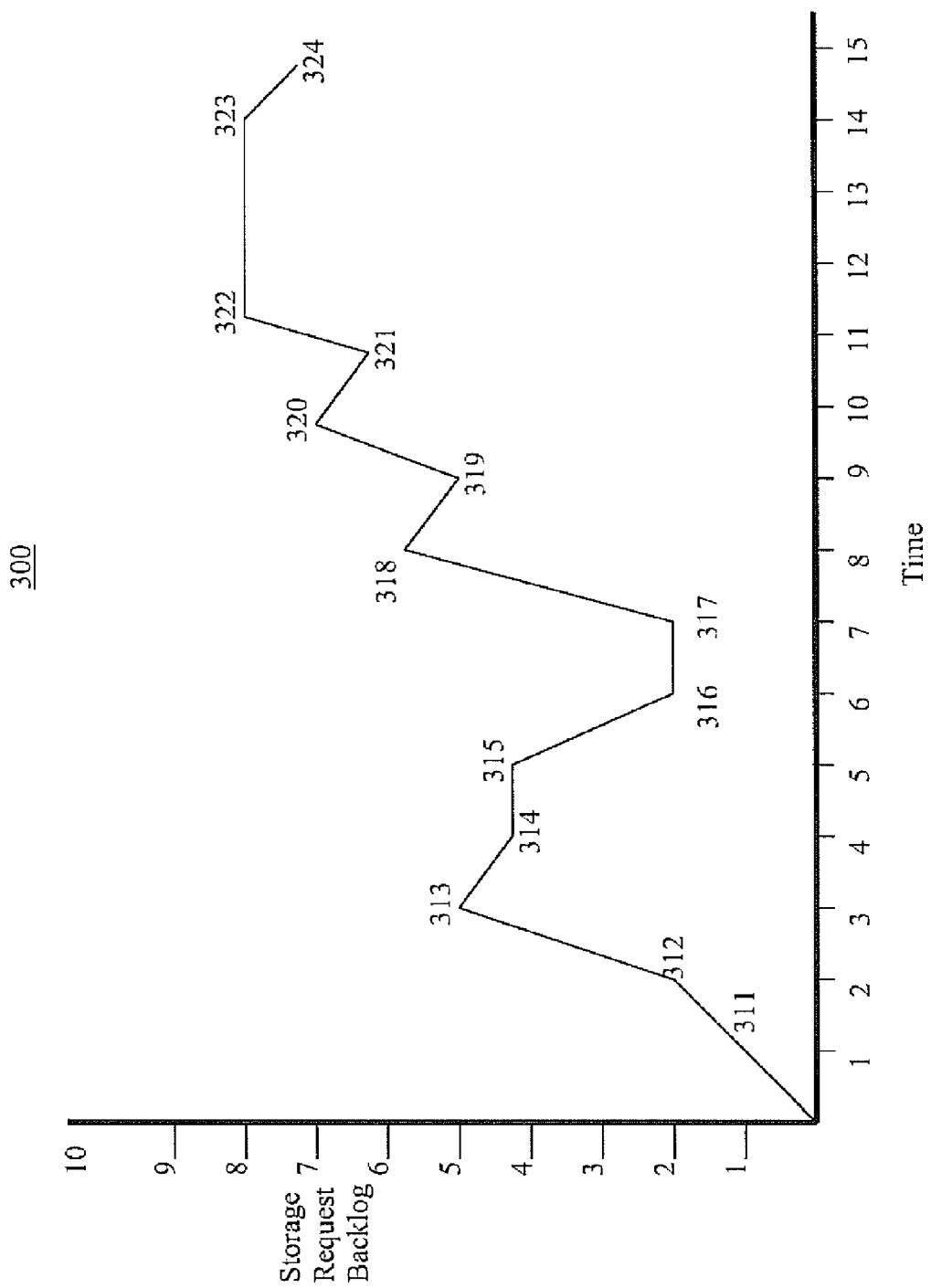
FIG. 3 is a graphical representation of an exemplary storage request back log trend in accordance with one embodiment of the present invention.

FIG. 3 is a graphical representation of an exemplary storage request back log trend 300 in accordance with one embodiment of the present invention. The graph includes a vertical axis indicating the number of storage requests that are backlogged and the horizontal axis indicates the sampling times. The points 311 through 324 indicate the number of request in a storage request backlog at the corresponding time. It is appreciated the number of storage requests that are back logged can increase or decrease over time. In one exemplary implementation, the sampling period is measured in seconds and an average threshold value of an increase of 3 or greater outstanding requests in a 3 second time period is the threshold value at which a primary data server stops forwarding requests to secondary data servers. Since at time 11 the average increase in the prior 3 second is 3 the primary data sever halts forwarding data storage requests to the secondary data server until there is a decrease in the backlog of storage request (e.g., at time 15). In one embodiment, a moving average can be utilized.

Figure 4:
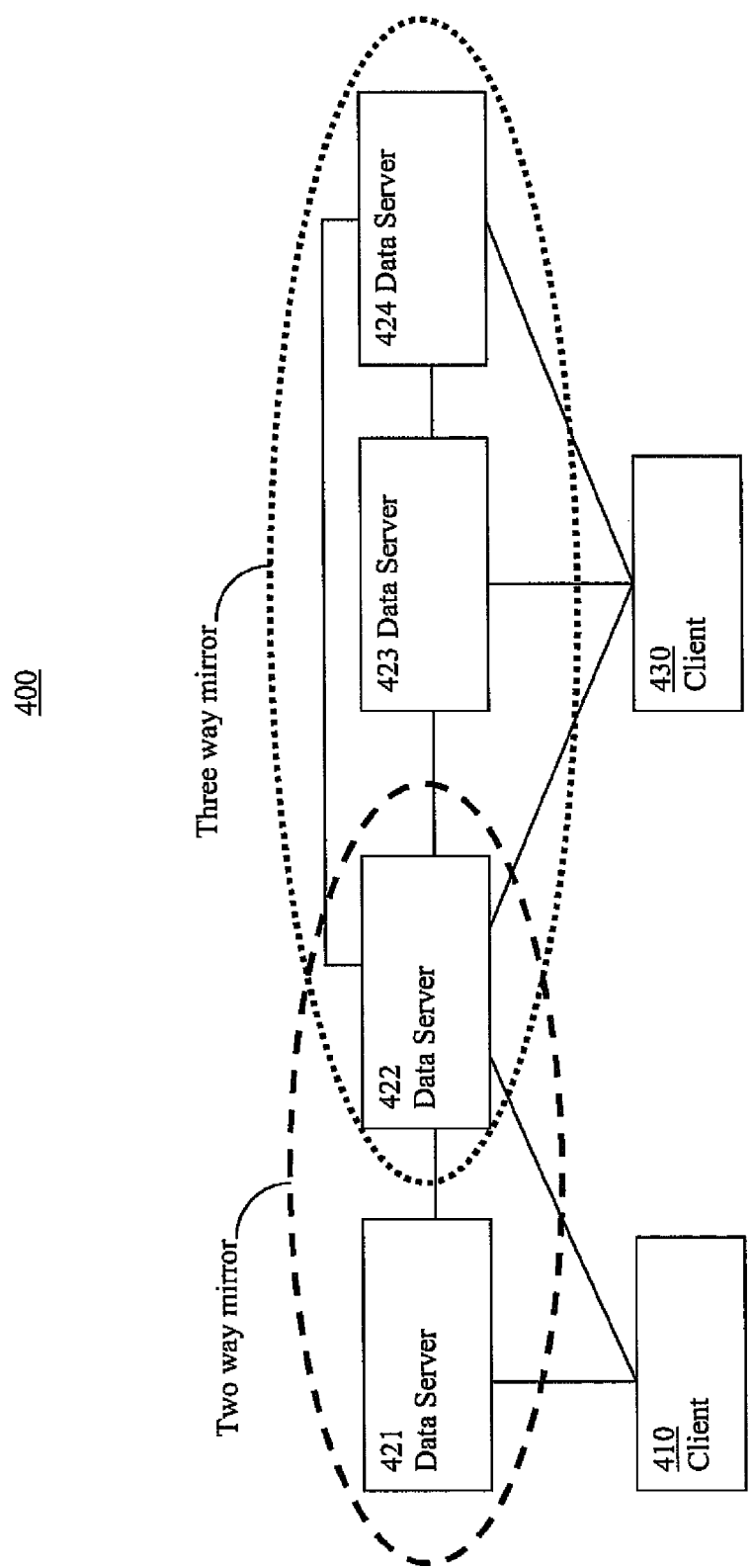
FIG. 4 is a block diagram of an exemplary replication storage system in accordance with one embodiment of the present invention.

As indicated above, the present techniques are applicable to a variety of configurations. FIG. 4 is a block diagram of replication storage system 400 in accordance with one embodiment of the present invention. Replication storage system 400 includes client 410 and 430 and data severs 421 through 424. Client 410 is communicatively coupled to data server 421 and 422 which are in turn communicatively coupled to one another and form a two way mirror. Client 430 is communicatively coupled to data server 422, 423, and 424 which are communicatively coupled to one another and form a 3 way mirror. In one embodiment, data server 422 receives storage requests from client 410 and tracks a storage request backlog of corresponding replication storage requests to data server 421 associated with information from client 410. Data server 422 estimates the corresponding trend and rejects additional storage requests from client 410 if the trend exceeds a threshold. Data server 422 also receives storage requests from client 430 and tracks a storage request backlog of corresponding replication storage requests to data server 423 and 424 associated with information from client 430. Data server 422 estimates the corresponding trend and rejects additional storage requests from client 430 if the trend exceeds a threshold.

Figure 5:
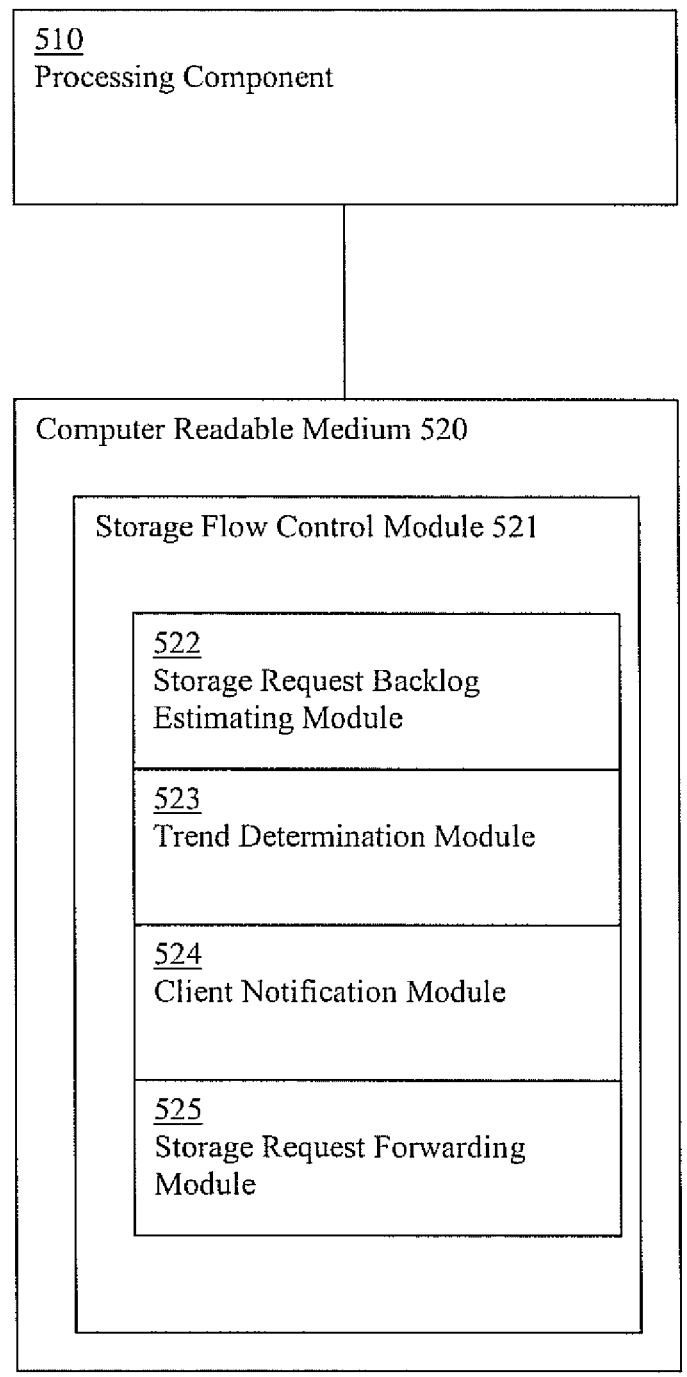
FIG. 5 is a block diagram of an exemplary system in accordance with one embodiment of the present invention.

FIG. 5 is a block diagram of system 500 in accordance with one embodiment of the present invention. System 500 includes a processor 510 and computer readable medium 520. In one embodiment, the computer readable medium 520 is a memory. Depending on the configuration and type of computer system 500 that is used, the memory can be volatile (e.g., such as DRAM, etc.), non-volatile (e.g., such as ROM, flash memory, etc.) or some combination of the two. Similarly, the memory can comprise other devices including solid-state devices, such as, for example, magnetic disk-based media, optical media, or the like.

In one embodiment, computer readable medium 520 includes Storage Flow Control Module 521, which includes Storage Request Backlog Estimating Module 522, Trend Determination Module 523, Client Notification Module 524 and Storage Request Forwarding Module 525. Storage Flow Control Module 521 includes instructions for performing a storage flow control method (e.g., storage flow control method 200). Storage Request Backlog Estimating Module 522 includes instructions for estimating in a primary data server an outstanding request backlog trend for a remote secondary data server (e.g., similar to block 201). In one embodiment, the estimating includes sampling a number of outstanding messages at a plurality of fixed time intervals; and determining if there is a trend in the number of outstanding messages over said plurality of fixed time intervals. Trend Determination Module 523 includes instructions for making a determination regarding a relationship of an outstanding request backlog trend to a threshold (e.g., similar to block 202). Trend Determination Module 523 includes instructions for notifying a client that the primary data server can not service additional requests (e.g. similar to block 203). Storage Request Forwarding Module 525 includes instructions for forwarding a storage request and corresponding information to a secondary data sever (e.g., similar to block 204).

Computer system 500 can be implemented as, for example, a server computer system, workstation computer system, desktop computer system, or laptop computer system. Similarly, computer system 500 can be implemented as a handheld device. Computer readable media can also be a number of different types of media that can be accessed by computer system and can include, but is not limited to, removable and non removable computer storage media, flash memory, hard disk, optical disk drive, compact disk (CD) etc.).

It should further be noted, that the computer system 500 can have some, most, or all of its functionality supplanted by a distributed computer system having a large number of dispersed computing nodes, as would be the case where the functionality of the computer system 500 is partly or wholly executed using a cloud computing environment.

Figure 6:
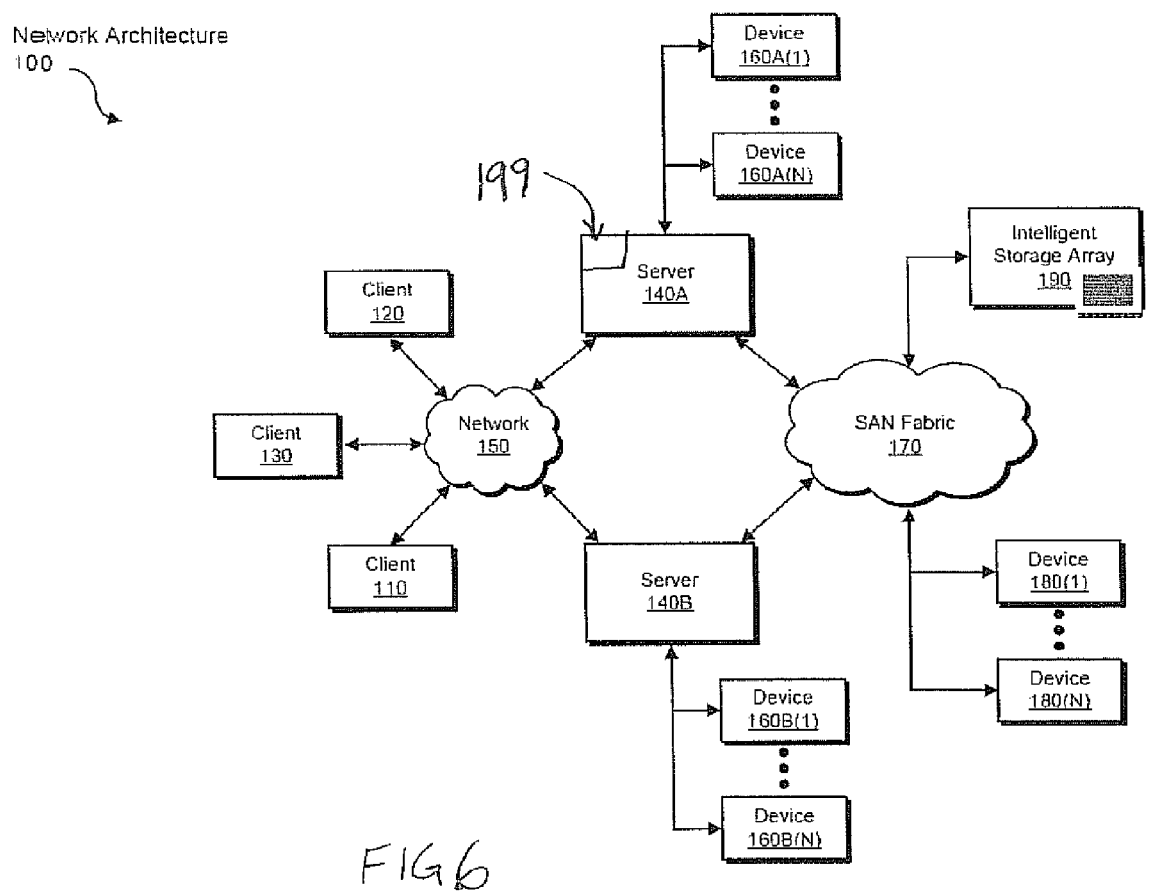
FIG. 6 is a block diagram depicting an exemplary network architecture in accordance with one embodiment of the present invention.

FIG. 6 is a block diagram depicting a network architecture 600 in which client systems 110, 120 and 130, as well as storage servers 140A and 140B (any of which can be implemented using computer system 210), are coupled to a network 150. Storage server 140A is further depicted as having storage devices 160A (1)-(N) directly attached, and storage server 140B is depicted with storage devices 160B (1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. Intelligent storage array 190 is also shown as an example of a specific storage device accessible via SAN fabric 170. In one embodiment, server 140A includes storage request flow control module 199. In one embodiment, storage request flow control module 199 is similar to similar to storage request flow control module 521. It is appreciated that present systems and methods are compatible with a variety of implementations. For example, portions of information and instructions associated with can be distributed in various resources.

Figure 7:
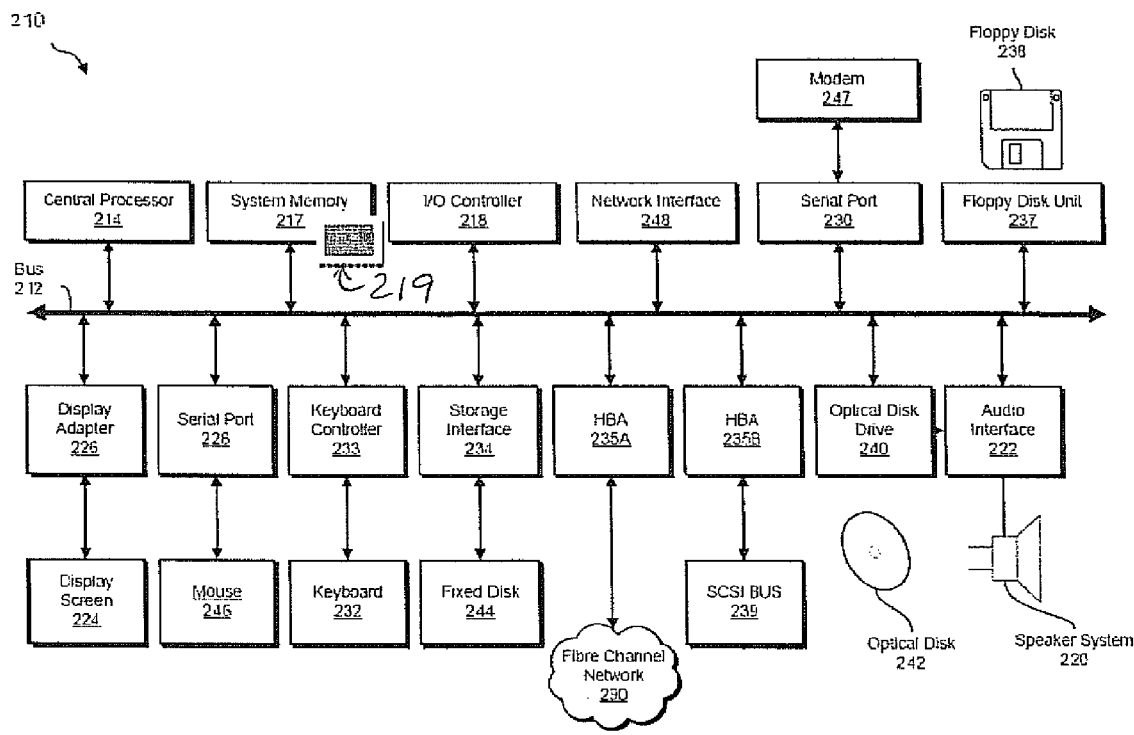
FIG. 7 depicts a block diagram of an exemplary computer system suitable for implementing the present disclosure.

FIG. 7 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fiber Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. In one embodiment, instructions for performing a storage request flow control method (e.g., similar to storage flow control method 200) are stored in one or more memories of computer system 200 (e.g., in memory location 219). The RAM is generally the main memory into which the operating system and application programs are loaded. In one embodiment, RAM 17 includes storage flow control module 299. In one embodiment, flow process module 299 is similar to storage flow control module 521. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or intelligent storage array 190. FIG. 6 depicts the use of a network such as the Internet for exchanging data, but the present disclosure is not limited to the Internet or any particular network-based environment.

The present storage request flow control systems and methods facilitate efficient and effective replication of information. The systems and methods can be implemented as run time processing. The replication and verification are intelligently performed while mitigating wasteful repetitive writing request transmission and processing. The systems and methods also facilitate utilization of a variety of differently configured system components. The systems and methods can be implemented with minimal or no interference with secondary data server operations. Present systems and methods can reduce consumption of network bandwidth and I/O bandwidth on both primary and secondary sides.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A storage flow control method:
   estimating in a primary data server what an outstanding storage request backlog trend is for a remote secondary data server, wherein said remote secondary data server is for duplicative or replication storage;
   determining a relationship of said outstanding storage request backlog trend to a threshold;
   notifying a client that said primary data server can not service additional storage requests if said outstanding storage request backlog trend exceeds said threshold, wherein a storage request and corresponding information are not forwarded to said secondary server until said outstanding storage request backlog trend does not exceed said threshold; and
   forwarding said storage request and corresponding information to said secondary server if said outstanding storage request backlog trend does not exceed said outstanding storage request backlog threshold.

2. A storage flow control method of claim 1 wherein said estimating comprises:
sampling a number of outstanding messages at a plurality of fixed time intervals; and
determining if there is said outstanding storage request backlog trend in said number of outstanding messages over said plurality of fixed time intervals.

3. A storage flow control method of claim 1 wherein said determining said trend includes determining if values monotonically increase.

4. A storage flow control method of claim 1 wherein said estimating in said primary server is performed without intruding on operations of said remote secondary data server.

5. A storage flow control method of claim 1 wherein said primary data server and said secondary data server have a mirrored configuration.

6. A storage flow control method of claim 1 wherein said primary data server and said secondary data server have a RAID5 configuration.

7. A storage flow control method of claim 1 wherein said estimating is based upon a moving average of outstanding storage requests to said secondary data server.

8. A non-transitory computer readable storage medium having stored thereon, computer-executable instructions that when executed by a computing device cause the computing device to perform a method comprising:
estimating in a primary data server what an outstanding storage request backlog trend is for a remote secondary data server, wherein said remote secondary data server is for duplicative or replication storage;
determining a relationship of said outstanding storage request backlog trend to a threshold;
notifying a client that said primary data server can not service additional storage requests if said outstanding storage request backlog trend exceeds said threshold,
wherein a storage request and corresponding information are not forwarded to said secondary server until said outstanding storage request backlog trend does not exceed said threshold; and
forwarding said storage request and corresponding information to said secondary server if said outstanding storage request backlog trend does not exceed said outstanding storage request backlog threshold.

9. The non-transitory computer readable storage medium of claim 8 wherein said estimating comprises:
sampling a number of outstanding messages at a plurality of fixed time intervals; and
determining if there is said outstanding storage request backlog trend in said number of outstanding messages over said plurality of fixed time intervals.

10. The non-transitory computer readable storage medium of claim 8 wherein said determining said trend includes determining if values monotonically increases.

11. The non-transitory computer readable storage medium of claim 8 wherein said estimating in said primary sever is performed without intruding on operations of said remote secondary data server.

12. The non-transitory computer readable storage medium of claim 8 wherein said primary data server and said secondary data server have a mirrored configuration.

13. The non-transitory computer readable storage medium of claim 8 wherein said primary data server and said secondary data server have a RAID5 configuration.

14. The non-transitory computer readable storage medium of claim 8 wherein said estimating is based upon a moving average of outstanding storage requests to said secondary data server.

15. A system, comprising:
a computer system having a processor coupled to a computer readable storage media and executing computer readable code which causes the computer system to perform a method of:
estimating in a primary data server what an outstanding storage request backlog trend is for a remote secondary data server, wherein said remote secondary data server is for duplicative or replication storage;
determining a relationship of said outstanding storage request backlog trend to a threshold;
notifying a client that said primary data server can not service additional storage requests if said outstanding storage request backlog trend exceeds said threshold,
wherein a storage request and corresponding information are not forwarded to said secondary server until said outstanding storage request backlog trend does not exceed said threshold; and
forwarding said storage request and corresponding information to said secondary server if said outstanding storage request backlog trend does not exceed said outstanding storage request backlog threshold.

16. The system of claim 15 wherein said estimating comprises:
sampling a number of outstanding messages at a plurality of fixed time intervals; and
determining if there is said outstanding storage request backlog trend in said number of outstanding messages over said plurality of fixed time intervals.

17. The system of claim 15 wherein said determining said trend includes determining if values monotonically increases.

18. The system of claim 15 wherein said estimating in said primary server is performed without intruding on operations of said remote secondary data server.

19. The system of claim 15 wherein said primary data server and said secondary data server have a mirrored configuration.

20. The system of claim 15 wherein said primary data server and said secondary data server have a RAID5 configuration.

* * * * *